United States Patent [19]
Thomas

[11] Patent Number: 6,038,292
[45] Date of Patent: Mar. 14, 2000

[54] METHODS AND APPARATUS FOR LANGUAGE REGISTRATION OF PREPAID, REMOTE ENTRY CUSTOMER ACCOUNT

[75] Inventor: Jerry S. Thomas, Salt Lake City, Utah

[73] Assignee: American Express Travel Related Services Company, Inc., New York, N.Y.

[21] Appl. No.: 08/965,712

[22] Filed: Nov. 7, 1997

[51] Int. Cl.⁷ .......................... H04M 1/64; H04M 15/00
[52] U.S. Cl. ................ 379/88.06; 379/144; 379/115
[58] Field of Search .................... 379/88.05, 88.06, 379/114, 115, 121, 127, 144

[56] References Cited

U.S. PATENT DOCUMENTS

| | | | |
|---|---|---|---|
| 4,736,405 | 4/1988 | Akiyama . | |
| 5,265,155 | 11/1993 | Castro | 379/144 |
| 5,353,335 | 10/1994 | D'Urso | 379/144 |
| 5,703,935 | 12/1997 | Raissyan et al. | 379/88.06 |

*Primary Examiner*—Paul Loomis
*Attorney, Agent, or Firm*—Snell & Wilmer

[57] ABSTRACT

An improved prepaid telephone card system is provided wherein a system center communicates to a calling party in the language spoken by the calling party. The system includes a system center which comprises an account database of prepaid accounts and a language library containing voice prompts and instructions in various languages. When the system center and the calling party are connected, the system center prompts the calling party in a plurality of languages to enter an account code; receives the account code from the calling party and determines if the account code is valid; accesses a database corresponding to the account code to determine if the calling party has previously set up a preferred language; presents to the calling party a plurality of languages available for selection as the preferred language; inputs from the calling party a selection of the preferred language and records the selection in the database; prompts the calling party, in the preferred language, for a destination telephone number of a desired party; and connects the calling party to the desired party.

28 Claims, 6 Drawing Sheets

METHODS AND APPARATUS FOR LANGUAGE REGISTRATION OF PREPAID, REMOTE ENTRY CUSTOMER ACCOUNT

TECHNICAL FIELD

The present invention relates, generally, to prepaid, remote memory accounts used by a consumer with a transaction card to purchase goods and services, and more particularly, to methods and apparatus for setting or registering a language to be used by a host computer in prompting the consumer during the course of transactions involving the prepaid remote memory accounts.

BACKGROUND ART AND TECHNICAL PROBLEMS

Remote memory, prepaid accounts for use in purchasing goods and services are generally well known. Presently known schemes typically include a printed transaction card, for example a wallet-sized plastic or cardboard card, which bears on one side a unique authorization or account number and instructions for access to funds, services, and the like. Such prepaid cards have been used extensively throughout the world. One such example is the use of these remote memory cards as prepaid long distance telephone calling cards.

In contrast to stored value cards (e.g., "smart cards") wherein a remaining account balance is stored within a memory resident in the card, remote memory systems generally store information pertaining to a prepaid account at a central host computer. The host computer typically stores information relating to the available balance remaining in the account, as well as information pertaining to past activity associated with the account. In particular, the host computer may store transaction data relating to various goods or services purchased using the card. In the context of a prepaid telephone calling card, the host computer may store telephone call data, including the date, time, duration, and various other parameters relating to calls which were placed using the prepaid telephone card. The host computer may be accessed via a telephone or data line by the consumer through the use of an authorization code, personal identification number (PIN), or the like.

The use of prepaid remote memory telephone cards is particularly prevalent in the United States. A typical prepaid telephone calling card includes a toll-free telephone number used by a consumer to access a host computer system, a unique authorization code associated with the card and a corresponding remote account, and dialing instructions. When a customer desires to use the card to place a long distance call, he dials the toll-free number, thereby accessing the host system which manages the remote accounts. The consumer then enters a predetermined authorization number for allowing access to the database. Next, the consumer enters the desired long distance telephone number, and the system connects the consumer with the desired calling destination. Long distance telephone charges attributed to the telephone call are deducted from the remaining balance in the account and the call is terminated when the account is fully consumed. A call history, which includes information pertaining to the calls charged to the various accounts, may also be maintained by the host computer for each account.

In the United States, preprinted instructions on how to use the transaction cards are generally printed directly on the cards in a single language, such as English. The use of such cards by individuals who are not conversant in the English language can be inconvenient or even impossible, depending on their fluency in the English language and their familiarity with how to use the transaction cards. While instructions may be printed on a single card in several languages, the number of languages that may be printed on a card is directly related to the size of the card and the level of detail to which the instructions will be printed; in the event wallet-sized cards are used, limited space usually precludes more than one language being printed on the card. Another option in attempting to resolve this language problem is to print a series of cards in a variety of different languages. However, this option has the disadvantage, among others, of increasing the issuer's and merchant's inventory by a factor equal to the number of languages printed. A third option is to assign each language a separate telephone number. Once connected to the host computer by phone, the consumer can be instructed on how to use the transaction card in that particular language. This however, has the disadvantage of requiring the issuer to maintain a phone number and connection for each language.

Consequently, a system and method is thus needed which will overcome the shortcomings of the prior art and will allow the issuer to easily produce transaction cards that may be used by consumers in a plurality of different languages.

SUMMARY OF THE INVENTION

The present invention provides methods and apparatus for conveniently and efficiently overcoming many of the shortcomings associated with the prior art.

In accordance with the present invention, a calling party purchases a transaction card, e.g., a prepaid telephone card, that comprises an access telephone number for accessing a system center and an authorization or account number unique to that particular transaction card and associated with an account stored in a database at the system center. The system center comprises an account database, a language database that includes audio indicia or voice prompts in a plurality of different languages for instructing the caller on how to place a telephone call through the system center or use various features associated with the system center, and a database containing information as to which of the plurality of languages the calling party desires to be instructed in.

When desiring to place a telephone call, the calling party dials the system center access number and upon connection to the system, enters the account number from the prepaid transaction card. The system center then looks in its database to determine which language is the preferred language of the calling party, instructing the calling party through transactions or various features in the preferred language. If information as to the preferred language is not in the database, the system center prompts the user to select a language. This selection is then recorded in the database so that the system center may communicate to the calling party in that preferred language in any subsequent connections between the system center and the calling party without requiring input from the calling party at that time regarding preferred language.

In accordance with one embodiment of the invention, the system center prompts the user to select a language from the plurality of languages stored in the database. Each of these languages is presented to the user in that particular language.

In accordance with another embodiment of the invention, the user may change the preferred language to another language while connected to the system center.

In accordance with another embodiment of the invention, the preferred language is accessed from the database by account number.

BRIEF DESCRIPTION OF THE DRAWING FIGURES

The present invention will hereinafter be described in conjunction with the appended drawing figures wherein.

DETAILED DESCRIPTION OF PREFERRED EXEMPLARY EMBODIMENTS

A preferred exemplary embodiment of the present invention surrounds a prepaid telephone card; however, it will be understood that the invention is not so limited. In particular, it will be appreciated that the present invention contemplates virtually any type of transaction card instrument or methodology for virtually any type of goods or services of whatever kind or nature. Although the present invention contemplates stored value cards (e.g., smart cards), a preferred exemplary embodiment described herein surrounds a prepaid, remote memory account telephone card for permitting the holder of the card to make telephone calls from virtually any telephone extension.

Prepaid calling cards may be purchased from a variety of retail outlets, for example, convenience stores, drug stores, gas stations, supermarkets, or the like. For a more thorough discussion of prepaid instruments and telephone cards, see U.S. patent application Ser. No. 08/510,590 entitled Methods and Apparatus for Providing a Prepaid, Remote Entry Customer Account for the Visually Impaired, filed on Aug. 2, 1995; U.S. Ser. No. 08/456,525 entitled Methods and Apparatus for Providing a Prepaid, Remote Memory Customer Account, filed Jun. 1, 1995; U.S. Ser. No. 08/458,715 entitled Refundable Prepaid Telephone Card, filed Jun. 1, 1995; U.S. Ser. No. 08/510,196 entitled Methods and Apparatus for Providing a Prepaid, Remote Entry Customer Account for the Hearing Impaired, filed on Aug. 2, 1995; U.S. Pat. No. 5,762,376 entitled Methods and Apparatus for Providing a Prepaid, Remote Entry Customer Account Having Multiple Language Capability, issued on Jun. 9, 1998, and U.S. Ser. No. 08/977,981 entitled Methods and Apparatus for Providing a Prepaid, Remote Entry Customer Account with Transaction Card and Corresponding Voice Indicia, filed on Nov. 25, 1997. All of these patent applications are filed in the name of John Taskett with the exception of U.S. Ser. No. 08/510,590 which was filed in the names of John Taskett and Barbara Piernot. The entire disclosures of these patent applications are incorporated herein by this reference.

Figure 1:
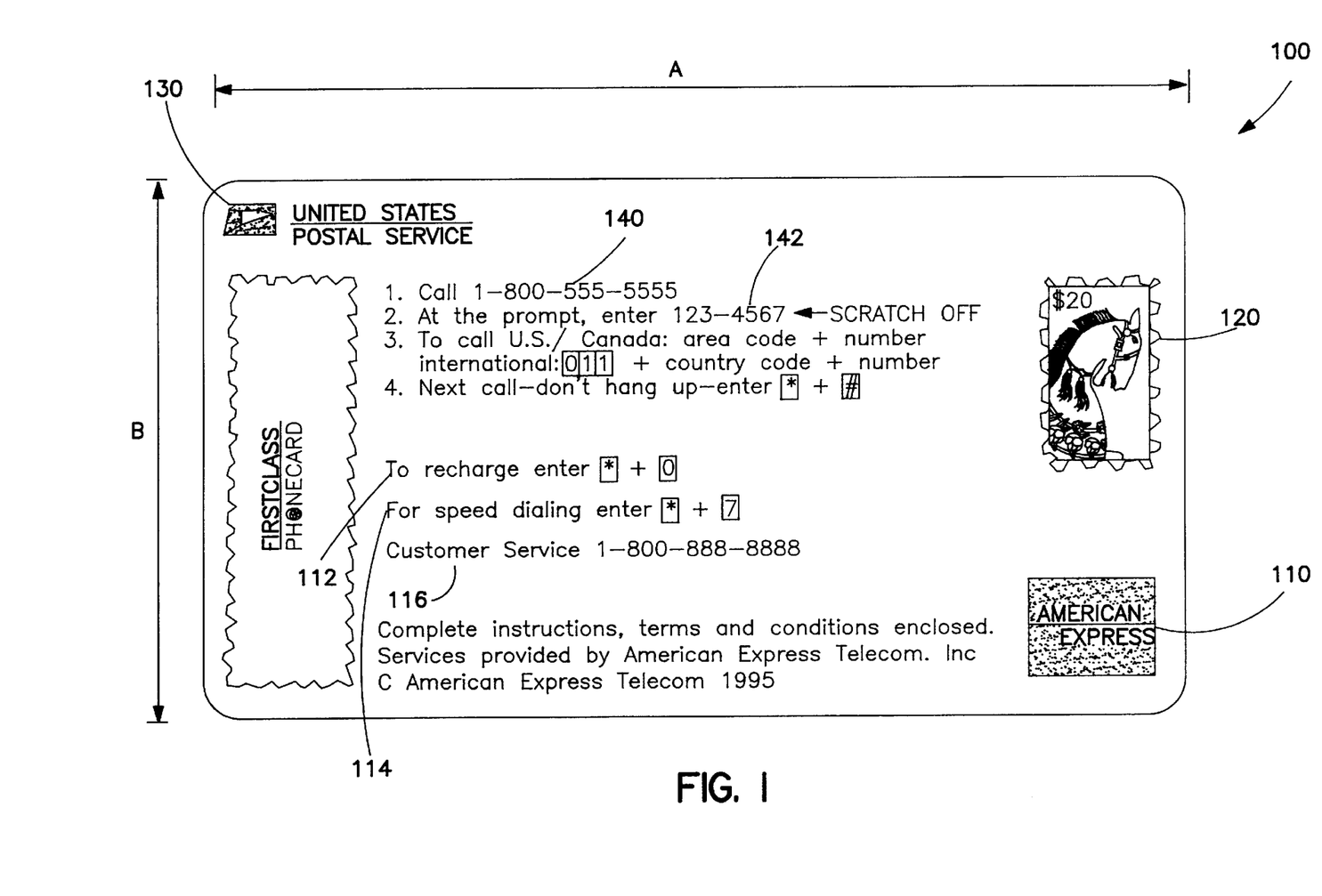
FIG. 1 is a view of one side of an exemplary telephone card in accordance with the present invention.

Referring now to FIG. 1, an exemplary telephone card 100 is analogous in its physical embodiment to a credit card-like instrument, being comprised of paper, plastic, cardboard or any other appropriate material. In a preferred embodiment, card 100 comprises plastic and has a length on the order of 8.5–8.7 cm (dimension "A"), a height on the order of 5.3–5.5 cm (dimension "B"), and a thickness on the order of 0.65–0.85 mm.

With continued reference to FIG. 1, telephone card 100 comprises an access telephone number 140 for accessing a service provider network and an authorization code or account number 142 for accessing an account database. Access telephone number 140 may be a toll-free 800 number, a 900 number, a local phone number or the like. Authorization code 142 is a number which is preferably unique to a particular telephone card. In the illustrated embodiment, authorization code 142 is a unique predetermined number that is printed on telephone card 100 before it is issued to the consumer. However, in another aspect of the invention, authorization code 142 may be a number that is selected by the individual user by having the user inform the service provider of the selected code number so that a corresponding account may be set up in the account database of the host computer.

With continued reference to FIG. 1, instructions may be set forth on one side of card 100 to explain to the consumer how to place phone calls through the system center. These instructions may be in a single language such as English or may be in a plurality of languages. However, regardless of the language of the instructions printed on card 100, the system center will provide the user the option of hearing instructions on placing a phone call in a language of the user's choice when the system center is dialed up.

In accordance with the illustrated embodiment, card 100 instructs the user to dial access telephone number 140 to access the host computer which maintains the account from which "funds" are "withdrawn" or otherwise consumed as a consequence of the telephone calls made in accordance with instrument 100 (line 1). Thereafter, instrument 100 instructs the user (line 2) to enter authorization code 142. In accordance with a further aspect of the present invention, a bar code or other suitable indicia of authorization code 142 may also be exhibited on instrument 100 for allowing authorization code 142 to be read by a bar code reader or other scanning device. This would alleviate the need for manual entry of authorization code 142 by the user.

The user is then instructed on how to dial a desired destination telephone number (line 3) either within the U.S./Canada or internationally. Information may also include instruction for placing additional calls (line 4).

With continued reference to FIG. 1, exemplary telephone card 100 provides an instruction 112 on how to "recharge" card 100 with additional telephone time, an instruction 114 on how to use a speed-dialing feature, and an instruction 116 on how to contact customer service. Again, in accordance with one aspect of the present invention, all of the above instructions as well instructions on how to use various features of the system center will be communicated to the user in a language selected by the user when the user connects with the system center.

In accordance with the illustrated embodiment, additional information, drawings, or designs 110 and 130 may be suitably printed on card 100. Information 110 and 130 may include trademarks or service marks of the issuer or information for advertising various related or unrelated products.

It is noted that FIG. 1 is illustrative only and that given the robust configuration of the present invention, virtually any additional information or data may be set forth on card 100.

Figure 2:
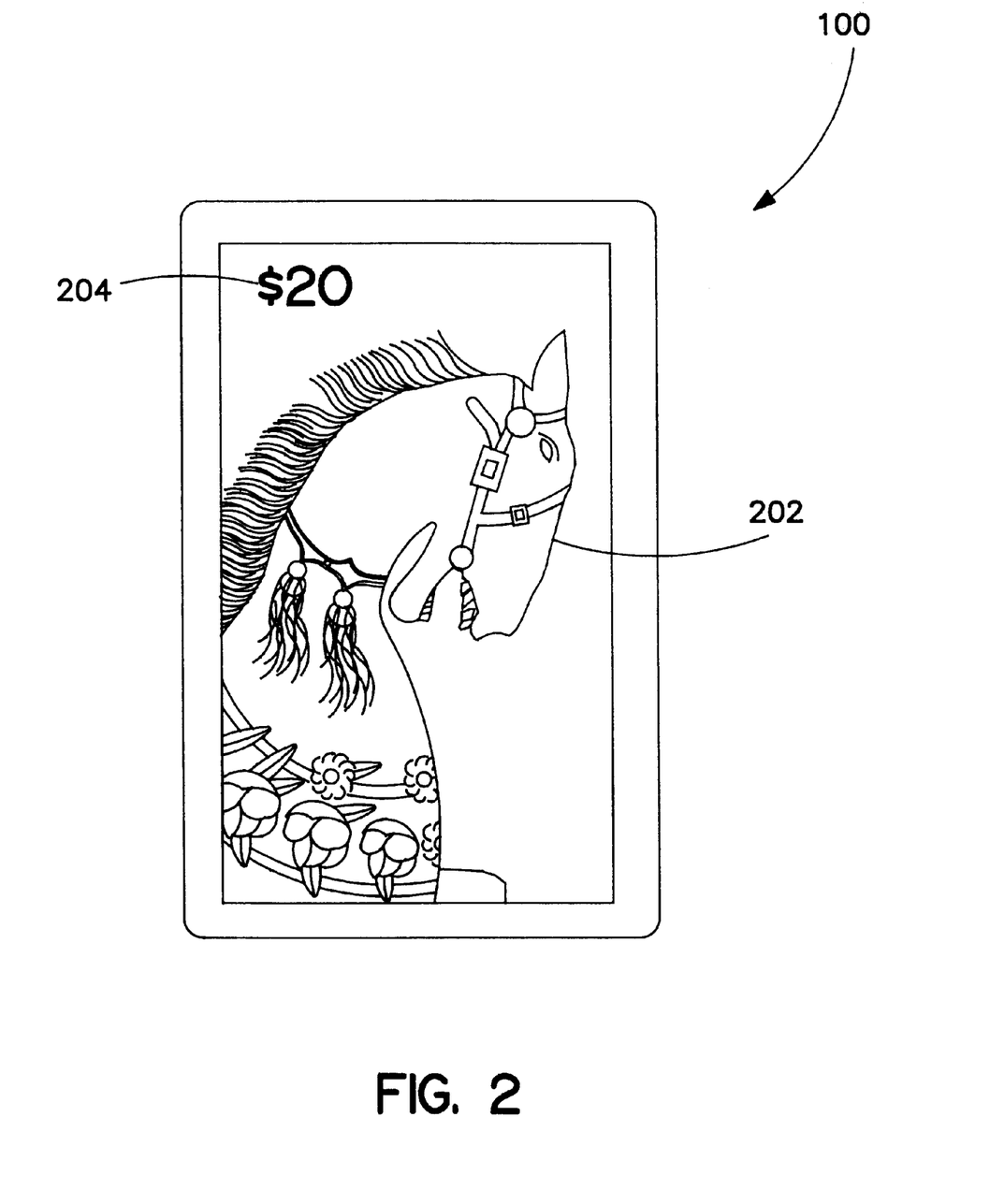
FIG. 2 is a view of the other side of the prepaid telephone card of FIG. 1.

Referring now to FIG. 2, the opposite side of telephone card 100 comprises a visual indicia 202 which may include a photograph, drawing or other design. A number 204 may be printed on transaction card 100 to indicate the value or initial amount associated with telephone card 100. This amount may be in currency such as U.S. dollars (for example, one dollar to several hundred dollars or more) or may be in calling card units or credits. Of course, once card 100 is used, the value of telephone card 100 may fluctuate according to whether telephone charges have reduced the remaining balance in the charge account or whether the user has "recharged" the balance in the charge account.

In another aspect of the invention, the host computer may notify the user of card 100, in the user's preferred language, of the current balance of the charge account when accessing the service provider.

Figure 3:
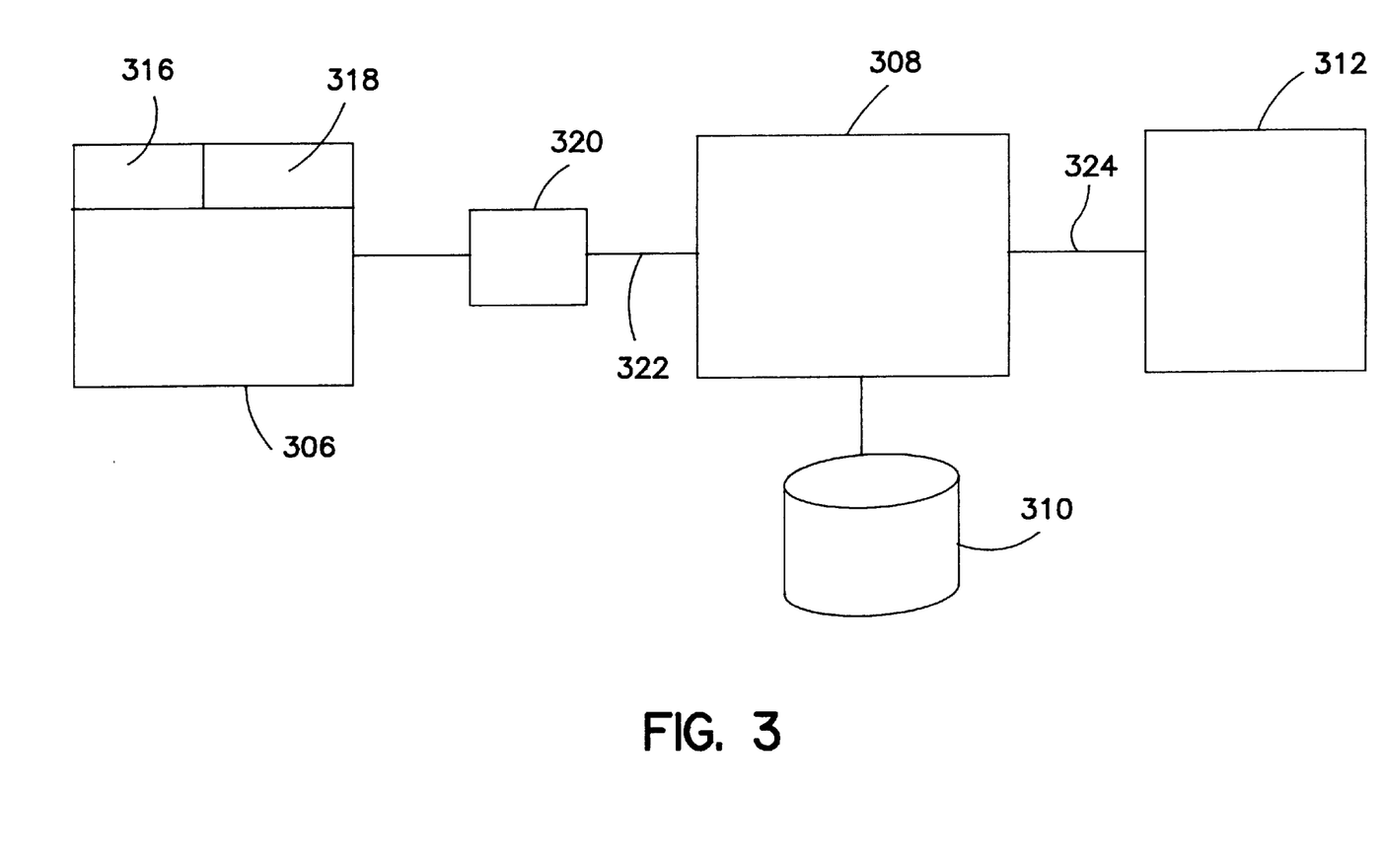
FIG. 3 is a schematic block diagram wherein the telephone card of FIGS. 1 and 2 is used in the context of a prepaid telephone card system.

Referring now to FIG. 3, a distributed transaction system for use with transaction card 100 suitably comprises a system center (host computer network) 308 having a database 310 associated therewith and a calling station 306 configured to communicate with system center 308 via a communications link 322. In a preferred embodiment, calling station 306 comprises a telephone which may include a keypad 316 or another input/output means 318 for reading bar code data, magnetic strip data, or other suitable medium for carrying information. When a caller places a call, he is suitably routed to system center 308 by way of a local exchange carrier (LEC) 320. System center 308 then routes the call through communications link 324 to a called station 312, where the call connection is monitored by system center 308.

In the embodiment shown in FIG. 3, system center 308 comprises telephone switching equipment suitable for connecting local and long distance telephone calls. Alternatively, system center 308 may be connected electronically to a remote long distance carrier (not shown) in order to facilitate the completion of long distance telephone calls.

In accordance with one aspect of the present invention, the functions of system center 308 may suitably be performed by a financial institution, credit card issuer, telephone company or other entity issuing telephone cards 100. Those skilled in the art will appreciate that system center 308 includes suitable computing hardware for effecting the functions set forth herein.

Figure 4:
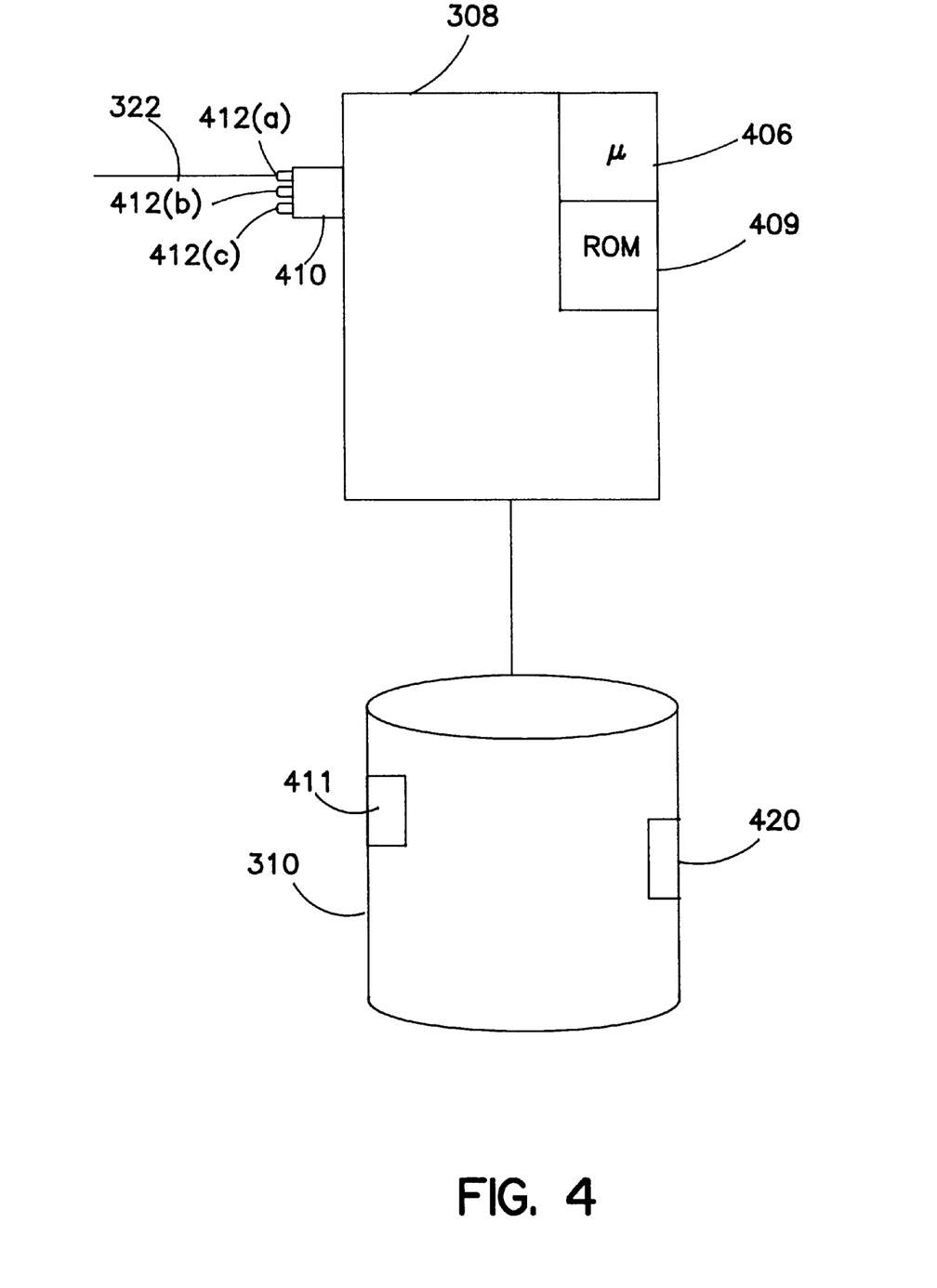
FIG. 4 is a schematic diagram of an exemplary host computer system in accordance with the present invention.

Referring now to FIG. 4, system center 308 suitably comprises an incoming call trunk 410, a controller or central processing unit (CPU) 406, and a memory means 409 such as a read only memory (ROM), random access memory (RAM), a tape drive, a compact disc, or the like. Trunk 410 suitably comprises one or more incoming telephone lines 412(*a*)–412(*c*). In accordance with a preferred embodiment, first incoming line 412(*a*) corresponds to a first predetermined telephone number (e.g., an 800 telephone number or a 900 telephone number), or a first predetermined series of telephone numbers, as desired. Similarly, second incoming line 412(*b*) corresponds to a second predetermined telephone number (or a series thereof), and so on. Thus, system center 308 may be configured to accommodate a large number of incoming telephone lines to thereby facilitate the allocation of particular feature sets to corresponding telephone lines.

More particularly, system center 308 may be suitably configured to process incoming calls from a wide variety of caller hardware configurations, including personal computers, voice telephone extensions, facsimile machines, modems, TTY devices, and the like. System center 308 may be configured to process various incoming calls as a function of the anticipated hardware and other characteristics associated with the incoming call. Moreover, certain of the incoming lines may be configured to process incoming calls based on non-hardware configurations, for example, the type of service provided to a particular clientele using system center 308. More particularly, first incoming line 412(*a*) may be used to process regular voice incoming calls, second incoming line 412(*b*) may be dedicated to processing calls from TTY devices, third incoming line 412(*c*) may be dedicated to processing incoming calls from data networks, and so on.

With continued reference to FIG. 4, processor 406 is suitably configured to retrieve appropriate software modules from ROM 409 to appropriately access prepaid accounts in database 310, to access voice prompts or announcements in various languages for guiding a caller through various system center menus, or for placing and processing phone calls.

With continued reference to FIG. 4, in a preferred embodiment of the present invention, database 310 suitably comprises an account database 411 for storing and managing various aspects of the prepaid accounts associated with calling cards 100 and a language library or database 420 for suitably storing voice indicia such as prerecorded messages, voice prompts, or instructions to be communicated to the caller at appropriate times via link 322 and calling station 306. This voice indicia is stored in a plurality of different languages with the appropriate language being communicated to the user of card 100 as explained in more detail below.

Language library 420 and account database 411 may be stored in any variety of mediums that are suitably accessed by processor 406, such as ROM, RAM, compact disc-read only memory (CD-ROM), compact disc-recordable (CD-R), tape drives, or the like. Databases 411 and 420 may be included in a single database structure or may be separate, individual databases.

Figure 5:
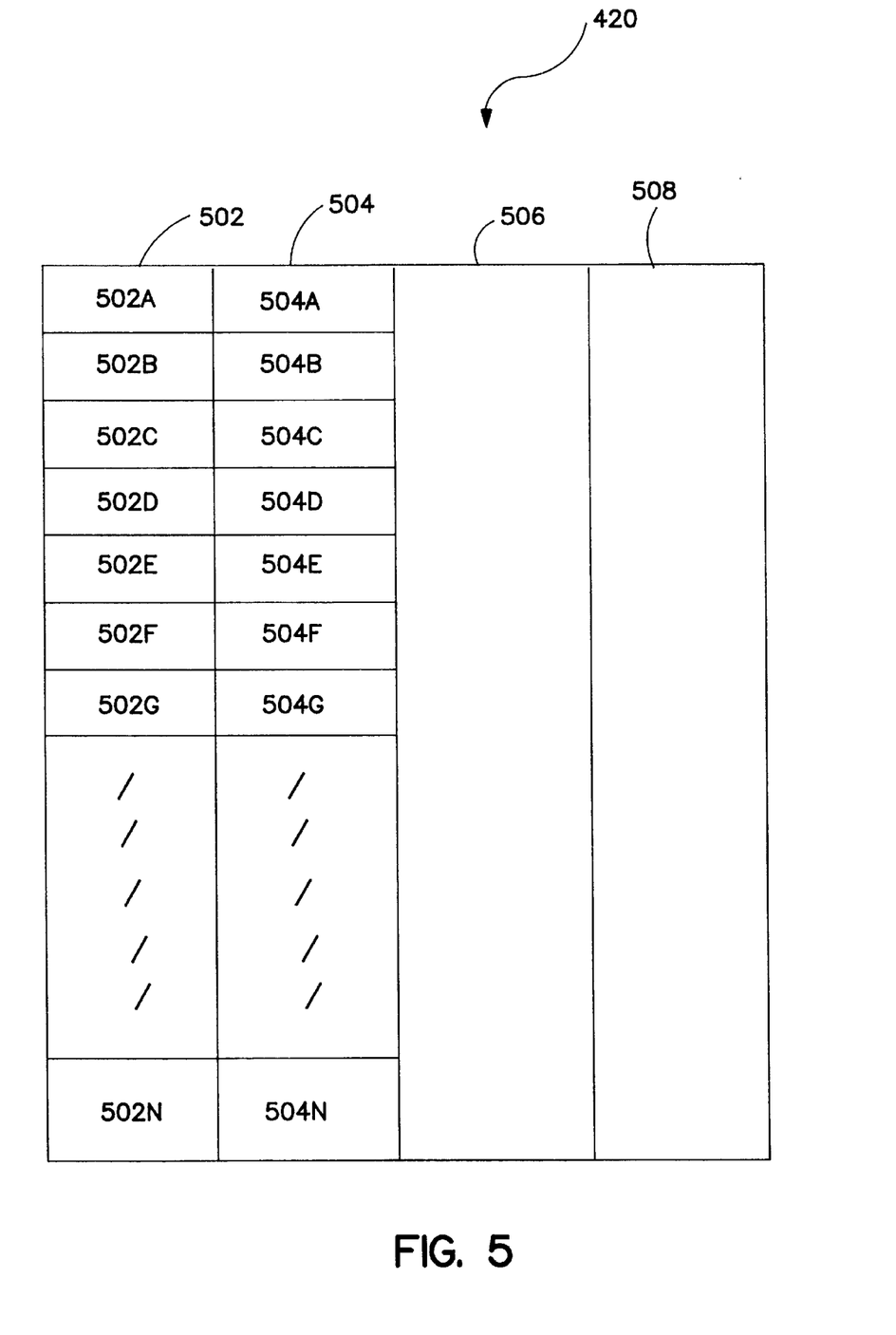
FIG. 5 is a schematic representation of voice prompts stored in a system center in accordance with the present invention.

Referring now to FIG. 5, in a preferred embodiment of the present invention, language library 420 comprises a plurality of records 502, 504, 506, 508, and so on; each record comprising a suite of audio messages, voice prompts, or instructions in a particular language for guiding a caller in placing a phone call and through the various features of system center 308. For example, record 502 may comprise all appropriate audio instructions in the English language, record 504 may comprise all the Spanish audio instructions, record 506 may comprise all the French audio instructions, and so on.

In accordance with the illustrated embodiment of FIG. 5, each record suitably comprises a plurality of fields, e.g., the English language record comprises fields 502A, 502B, 502C, 502D, and so on. Each field in a record comprises an audio instruction that may be suitably retrieved by processor 406 and relayed to the calling party over telephone line 322 at appropriate times during the placing of a call through system center 308.

For example, if record 502 comprises the suite of English language messages and instructions, each field of record 502 may contain appropriate instructions in the English language such as "Welcome to the American Express prepaid phone card service" (field 502A); "Please enter your phone card number now" (field 502B); "Please enter one to select the English language as your default language" (field 502C); "You have [x number of] units remaining on your phone card" (field 502D); "Enter the destination phone number or a star (*) for the options menu" (field 502E); "Your input could not be recognized" (field 502F); "One minute remaining." (field 502G); "Thank you for using American Express, goodbye" (field 502N); and so on. Corresponding instructions in Spanish and French will be found in fields 504A–504N and fields 506A–506N, respectively. It goes without saying that various other fields or subfields may also be incorporated into record 502 in addition to, or in lieu of, one or more of the above-described fields.

Referring now specifically to the flowchart of FIG. 6 and with references to FIGS. 1–5 described above, an exemplary method for selecting and registering a default language in the context of prepaid phone card system will be explained. While the following method may be implemented entirely with hardware such as digital devices, a preferred embodiment comprises the following methodology implemented by a computer readable program code that is stored in a computer usable medium such as memory means 409. The program code may then be executed by CPU 406.

The calling party in possession of calling card 100 uses calling station 306 to dial access number 140. Once system center 308 is connected to calling station 306 as shown at block 602, the system center, at block 604, prompts the calling party for account code 142. This prompt may be, for example, a tone that the calling party recognizes as a prompt for account code 142 or audio instructions issued in several languages advising the caller to input account code 142. In the latter case, audio instructions from fields 502B, 504B, 504C and so on, are retrieved and played to the calling party.

In an alternate embodiment, it may be desirable to enter information such as access number 140 and account code 142 through alternative input/output modality 318 at phone 306; for example, a bar code containing both phone number 140 and account number 142 may be scanned into calling station 306 with a bar code reader. This information would then be used to connect to system center 308.

Figure 6:
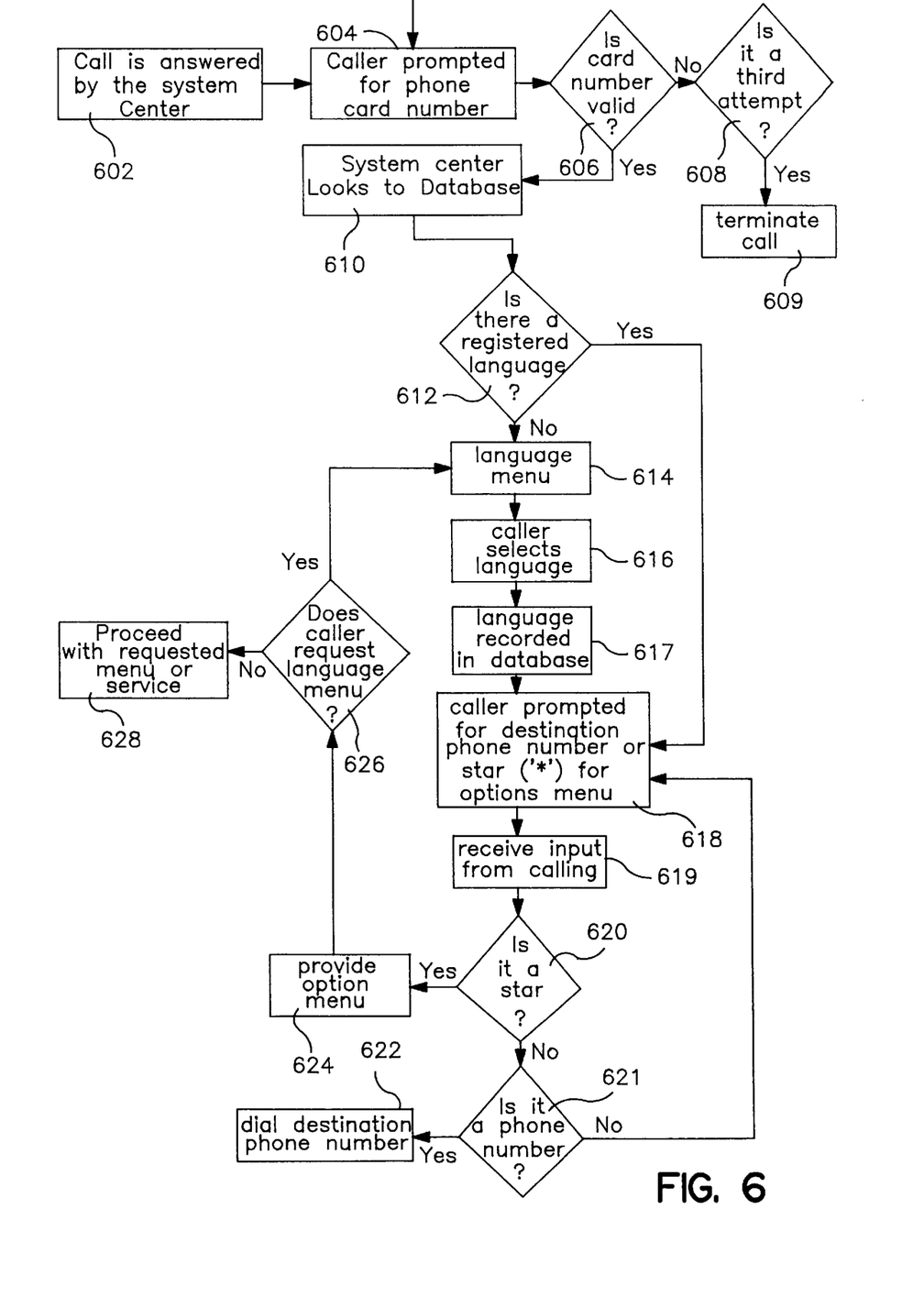
FIG. 6 is a flowchart showing an exemplary sequence for configuring the voice prompts of a system center for a preferred language in accordance with the present invention.

With continued reference to FIG. 6, upon receipt of account code 142, system center 308, at block 606, accesses database 310 to determine if account code 142 is valid (i.e. the account code is checked to confirm that such a number exists and that there is money or credit units remaining in the account). If account code 142 is not valid as shown at block 608, system center 308 informs the calling party that the account number is invalid and requests another account number at block 604. System center 308 will allow a predetermined number of incorrect entries (e.g., three times) before going to block 609 and terminating the connection between telephone 306 and system center 308.

If the card number is determined to be valid, system center, goes to block 610 and accesses database 310 to determine if the calling party has set up a default or preferred language to be used by system center 310 when communicating to calling party through calling station 306. In a preferred embodiment, account code 142 is used in accessing database 310 to determine if a preferred language has been established.

If the calling party has previously registered a language, then system center 308 goes to block 618 and prompts the calling party, using the preferred language, to enter a destination phone number or a star ("*") for the options menu. In other words, if the registered language is English, system center 308 goes to language database 410 and retrieves field 502E from record 502 which includes audio indicia in English requesting a destination phone number or option menu command.

If, however, this is the first time for the calling party to access system center 308 with account number 142, then no preference for a language will be recorded in database 310. In this case, system center goes to the language submenu of the options menu as indicated by block 614.

In the language submenu, system center 308 presents to the calling party a menu of available languages contained in the language database 420. When the menu of languages is reported to the calling party, each available language is recited to the calling party in that particular language along with a corresponding number that the calling party is to input from telephone 306 to choose that language. For example, system center 308 might say to the calling party "Please enter one to select English as your default language (recited in English); Please enter two to select Spanish as your default language (recited in Spanish); Please enter three to select French as your default language (recited in French)" and so on. These audio instructions are retrieved from fields 502E, 504E, and 506E in language database 420, respectively.

Next, at block 616, the calling party selects the desired default language by pressing the corresponding push-button on telephone 306. Thus, if the calling party wants to set the default language as Spanish, the calling party would push the "two" button at calling station 306. Other methods of selecting a language are, of course, possible. For example, this function may also be implemented by using voice recognition circuitry or software, or by including special function buttons on public phones, and so on.

At block 617, system center 308 records the caller's selection in database 310 so that any subsequent connections between system center 308 and the calling party (i.e. the person using account code 142) will be conducted in the selected language without requiring system center 308 to inquire from the calling party as to a language preference. Information relating to the preferred language may be stored in, for example, a preferred language reference database that contains the language selections of all telephone card users or may be stored in language database 420 where the audio messages in various languages are stored. In a preferred embodiment, the language selection of the calling party is stored in account database 411 where various aspects of the prepaid accounts are stored.

Next, system center 308 proceeds from block 617 to block 618, where the calling party is prompted in the preferred language to enter a destination phone number or a star ("*") for the options menu. These audio instructions provided to the calling party are retrieved from appropriate fields in language database 420.

At block 619, system center 308 then receives the calling party's input.

At blocks 620 and 621, system center 308 determines whether the input at block 619 is a star or a destination phone number. If it is neither, system center returns to block 618 and again prompts the calling party for a destination phone number or a star.

If the calling party enters a destination phone number at block 619, system center 308 goes to block 622 where it connects the calling party to communications link 324 and dials the destination phone number.

If the calling party receives a star at block 619, then system center 308 provides the option menu as indicated at block 624. The options menu may provide various options and features relating to placing long distance telephone calls, personalizing the system center for routine transactions by the calling party, or performing other transactions that may or may not be related to placing telephone calls. In the exemplary embodiment, the options menu provides various submenus such as a speed dialing submenu for storing frequently called phone numbers, a customer billing submenu for obtaining balance information or billing information relating to the phone card number, a customer service submenu for connecting with a customer service representative, a recharge submenu for adding additional money amounts or credit units to the phone card account, a language submenu for changing the default language of the system center, and other menus or submenus as deemed appropriate. All of the above submenus can be conducted in the language spoken by the calling party. To determine the correct language to use, system center 308 simply refers to database 310 and looks to see what the default language is.

With continued reference to FIG. 6, if system center 308, at block 626, detects a request by the calling party for a submenu other than the language submenu, the system center goes to block 628 and performs the requested task. On the other hand, if system center 308 receives a request for the language submenu, the system center proceeds to block 614. At block 614, the calling party can change the default language to any language that is offered by system center 308.

Other instructions or voice prompts not mentioned above may be appropriately provided to the calling party in his preferred language. These might include, for example, the number of credit units remaining on the phone card (contained in fields 502D–599D), a warning that only one minute or one credit unit is remaining on the phone card (fields 502G–599G), a message upon termination of the connection between the calling party and system center 308 (fields 502N–599N) and so on.

While FIG. 6 shows the present invention as incorporated with a prepaid calling card system, it is important to remember that the present invention contemplates systems that use other types of prepaid transaction cards. The embodiment shown in FIG. 6 should not be interpreted as being limited to prepaid telephone cards.

Although the present invention is set forth herein in the context of the appended drawing figures, it should be appreciated that the invention is not limited to the specific forms shown. Various other modifications, variations, and enhancements in the design and arrangement of the host computer, language library, telephone card, and the like as set forth herein may be made without departing from the spirit and scope of the present invention as set forth in the appended claims.

I claim:

1. A method for selecting a language to be used by a system center in guiding a calling party in placing a prepaid telephone call through the system center from any telephone configured to be connected to the system center, comprising the steps of:
   (a) connecting a calling party, from any telephone configured to be connected to the system center, to the system center;
   (b) entering, by the calling party selecting corresponding telephone number keys, an account code, representing an account with a prepaid account balance;
   (c) receiving said account code from the calling party and determining if said account code represents a valid prepaid account;
   (d) after receipt and validation of said account code, using said account code to access a database corresponding to said account code to determine if the calling party has previously established a preferred language to be used by the system center when communicating to the calling party;
   (e) prompting the calling party, in said preferred language, for a destination telephone number of a desired party;
   (f) connecting the calling party to the desired party; and
   (g) reducing the amount of prepaid credit in said prepaid account during the duration of the call connection.

2. The method of claim 1 further comprising the step of allowing the calling party to change said preferred language while connected to the system center.

3. The method of claim 1 further comprising the steps of:
   (i) presenting to the calling party a plurality of languages available for selection as said preferred language;
   (ii) inputting, by the calling party, a selection of said preferred language and recording said selection in said database, wherein said step of inputting a selection from said plurality of languages comprises inputting a number from the calling party corresponding to one of said plurality of languages.

4. The method of claim 1 wherein said step of presenting a plurality of languages available is only required if said database indicates that the calling party has not previously set up said preferred language.

5. The method of claim 1 wherein said step of entering an account code further comprises prompting the calling party in a plurality of languages to enter an account code and presenting to the calling party each of said plurality of languages in that particular language.

6. The method of claim 1 further comprising the step of informing the calling party in said preferred language of a remaining balance of an account associated with said account code and managed by the system center.

7. The method of claim 1 further comprising the step of instructing the calling party in said preferred language in adding additional credit to said remaining balance of said account.

8. The method of claim 1 further comprising the steps of:
   allowing the calling party to enter additional account codes if said account code entered initially is invalid; and
   terminating the connection between the system center and the calling party after a predetermined number of invalid attempts at entering said additional account codes.

9. A method for selecting an appropriate language for communicating with a consumer accessing a prepaid telephone system center through any suitably connected calling station worldwide comprising the steps of:
   (a) connecting the prepaid telephone system center to any suitably connected calling station worldwide;
   (b) receiving an initial authorization code from the calling station by the calling party inputting corresponding numbers through the calling station number entry system;
   (c) verifying that said initial authorization code represents a valid account with a prepaid account balance;
   (d) determining by comparing said authorization code with a selected language database whether the consumer has previously selected a preferred language to be used by the prepaid telephone system center when communicating to the consumer;
   (e) communicating to the consumer in said preferred language; and
   (f) decreasing the prepaid account balance during the duration of the telephone call.

10. The method of claim 9 further comprising the step of allowing the consumer to change said preferred language while connected to said prepaid telephone system center.

11. The method of claim 9 further comprising the step of prompting the consumer in a plurality of languages to enter an authorization code before said step of receiving an initial authorization code.

12. The method of claim 9 further comprising the steps of:
(i) inputting from the consumer a selection for said preferred language if not previously selected by the consumer, wherein said step of inputting a selection for a preferred language comprises inputting a selection from a group of limited available languages;
(ii) recording said preferred language in a database so that the prepaid telephone system center may communicate to the consumer in said preferred language in any subsequent connections between the prepaid telephone system center and the consumer without requiring input from the consumer regarding said preferred language.

13. The method of claim 9 further comprising the steps of:
allowing the consumer to make a predetermined number of attempts at entering a valid authorization code if said authorization code entered initially is not valid; and
terminating the connection between the prepaid telephone system center and the calling station once said predetermined number of attempts have been exhausted.

14. A computer system for effectuating prepaid telephone calls between a calling party at any location and a destination party comprising:
an incoming call trunk configured to connect the calling party to said computer system;
an outgoing call trunk configured to connect said computer system to the destination party;
an account database configured to store account information associated with an account code used by the calling party;
a language database configured to store audio indicia including a plurality of languages for communicating to the calling party;
a reference database configured to store one of said plurality of languages in said language database which is an associated language with the calling party; and
a central processing unit configured to receive said account code from the calling party by the calling party's manual entrance of said account code, use said account code to access said reference database according to said account code to determine said associated language, prompt the calling party in said associated language to enter a number of the destination party, and connect the calling party to the destination party,
wherein said account information includes a prepaid account balance which is reduced during the duration of a prepaid telephone call.

15. The computer system of claim 14 further comprising a means for allowing the calling party to change said associated language while connected to the computer system.

16. The computer system of claim 14 further comprising a means for allowing the calling party to make a predetermined number of attempts at entering a valid account code if said account code initially entered is invalid, and a means for terminating the connection between the computer system and the calling party once said predetermined number of attempts have been exhausted.

17. The computer system of claim 14 wherein said account database comprises said reference database.

18. A computer system comprising a computer usable medium having computer readable program code means embodied therein for selecting an appropriate language for a prepaid telephone system center to communicate with a calling party, the computer readable program code means in said computer system including:
means for prompting the calling party in a plurality of languages to enter an account code;
means for receiving said account code by the calling party entering said account code through the telephone keypad and determining if said account code represents a valid prepaid account with a current positive account balance;
means for using said account code to access a database to determine if the calling party has previously established a preferred language to be used by the prepaid telephone system center when communicating to the calling party;
means for presenting a plurality of languages available for selection by the calling party as said preferred language;
means for inputting from the calling party a selection from said plurality of languages;
means for recording said selection in said database;
means for communicating to the calling party in said preferred language; and
means for reducing the amount of said positive account balance based on the duration of the communication.

19. The computer system of claim 18 wherein said recording means comprises recording said preferred language in said database so that the prepaid telephone system center may communicate to the calling party in said preferred language in any subsequent connections between the prepaid telephone system center and the calling party without requiring input from the calling party regarding said preferred language.

20. The computer system of claim 18 wherein said presenting means and said inputting means are only performed if said database indicates that the calling party has not previously set up said preferred language.

21. The computer system of claim 18 further comprising means for allowing the calling party to change said preferred language while connected to the prepaid telephone system center.

22. The computer system of claim 18 further comprising means for allowing the calling party to enter additional account codes if said account code entered initially is invalid; and means for terminating the connection between the prepaid telephone system center and the calling party after a predetermined number of invalid attempts at entering said additional account codes.

23. The computer system of claim 18 wherein said presenting means further comprises means for presenting to the calling party each of said plurality of languages in that particular language.

24. The computer system of claim 18 further comprising means for informing the calling party in said preferred language of a remaining balance of an account associated with said account code.

25. The computer system of claim 24 further comprising means for instructing the calling party in said preferred language in adding additional credit to said remaining balance of said account.

26. The computer system of claim 18 wherein said means for accessing a database includes using said account code of said calling party in accessing said database.

27. The computer system of claim 18 further comprising means for prompting the calling party in said preferred language for a desired party and means for connecting the calling party to said desired party.

28. The computer system of claim 18 wherein said inputting means comprises means for inputting a number from the calling party corresponding to one of said plurality of languages.

* * * * *